Nov. 27, 1923.

E. D. PUTT 1,475,873

BEAD SPLICING MACHINE

Filed March 29, 1918   4 Sheets-Sheet 2

INVENTOR.
Edward D. Putt,
BY G. L. Ely
ATTORNEY

WITNESS

Nov. 27, 1923.

E. D. PUTT 1,475,873

BEAD SPLICING MACHINE

Filed March 29, 1918    4 Sheets-Sheet 3

WITNESS

INVENTOR.
Edward D. Putt.
BY
ATTORNEY

Nov. 27, 1923.
E. D. PUTT
BEAD SPLICING MACHINE
Filed March 29, 1918    4 Sheets-Sheet 4
1,475,873
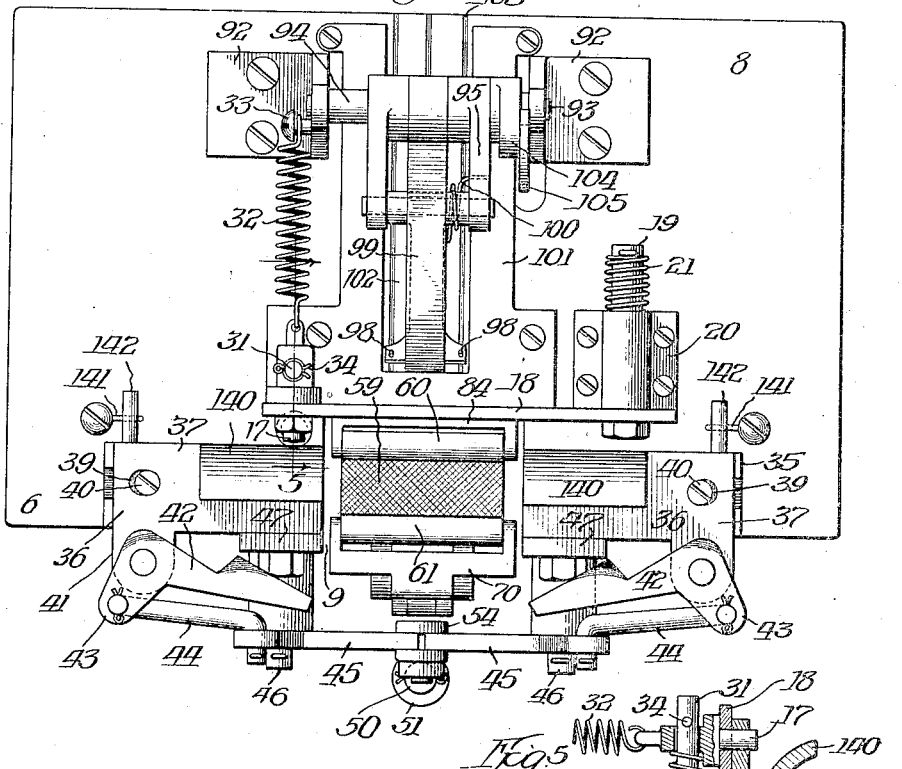

Patented Nov. 27, 1923.

1,475,873

UNITED STATES PATENT OFFICE.

EDWARD D. PUTT, OF AKRON, OHIO, ASSIGNOR TO THE FIRESTONE TIRE & RUBBER COMPANY, OF AKRON, OHIO, A CORPORATION OF OHIO.

BEAD-SPLICING MACHINE.

Application filed March 29, 1918. Serial No. 225,445.

*To all whom it may concern:*

Be it known that I, EDWARD D. PUTT, a citizen of the United States, residing in the city of Akron, county of Summit, and State of Ohio, have invented certain new and useful Improvements in Bead-Splicing Machines, of which the following is a specification.

This invention relates to a mechanism for splicing lengths of beads for pneumatic tires. In the manufacture of pneumatic tires and particularly those of the clincher type it is usual to form the bead by extruding it from a die in long lengths which are cooled and then covered by fabric. A length of bead sufficient to go around the base of the tire is then cut off, the ends dipped in rubber cement and pressed together and a piece of fabric is wrapped around the abutting ends of the bead and firmly rolled into place. The machine designed here insures a tight fit of the two ends of the bead and severs a piece of fabric of the proper length and smoothly and evenly applies the severed piece of fabric over the splice. All of these operations are performed with a single depression of the foot-treadle attached to the machine and the work is done more rapidly and perfectly than it is possible to do it by hand.

The machine forming the subject matter of this application is but one embodiment of the invention and it is obvious that changes and modifications may be made without sacrificing any of the benefits of the invention.

In the drawings herein:

Fig. 4 is a plan

Fig. 5 is a detail of the knife operating mechanism, being taken on the section line 5—5 of Fig. 4

Fig. 6 is a horizontal section through the plunger

Fig. 7 is a detail view showing the fabric applying rollers at the end of their movement Fig. 8 is a perspective view of a spliced bead, and Fig. 9 is a cross-section of a finished bead.

Figure 1:
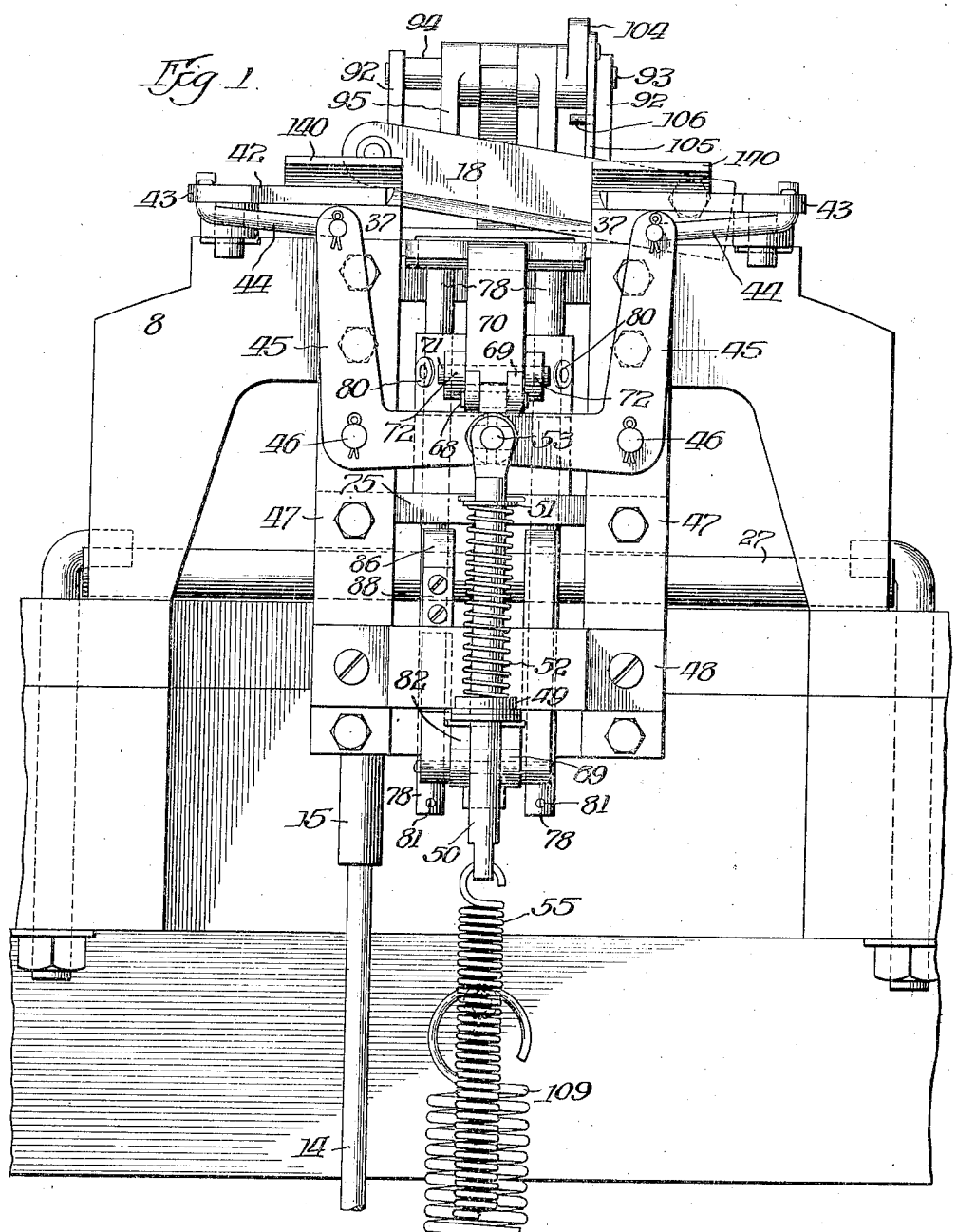
Fig. 1 is a front elevation of the machine

The machine comprises a framework 1, which carries the operating parts and on the lower part of which is carried a fulcrum 2 whereon is pivoted a foot-treadle 3 which operates the entire mechanism. On the framework above the treadle is carried an air cylinder 4 in which is mounted a plunger, the plunger rod showing at 5, the purpose of which is to insure an easy return of the foot-treadle and the parts operated by it to their normal position, whereby the machine may not be injured by abrupt or sudden movement of its parts. The front of the table 6, mounted on the framework, is recessed at 7 to permit of movement of operating parts of the machine. Over the recess 7 is secured in any suitable manner an arched base plate 8 on which the mechanism comprising the operating parts of the device is mounted. The front of the plate is recessed at 9 over which point the splice in the bead occurs and at which place the operations are performed on the bead.

To enable the operation of the machine to be thoroughly understood there is illustrated in Fig. 8 the two ends of the bead which are understood to be coated with a tacky rubber cement and pressed together, the joint being shown in dotted lines at 12. A short strip of fabric is placed around the splice and rolled into place, the severed and applied piece of fabric being shown at 13 in Figs. 8 and 9.

Figure 2:
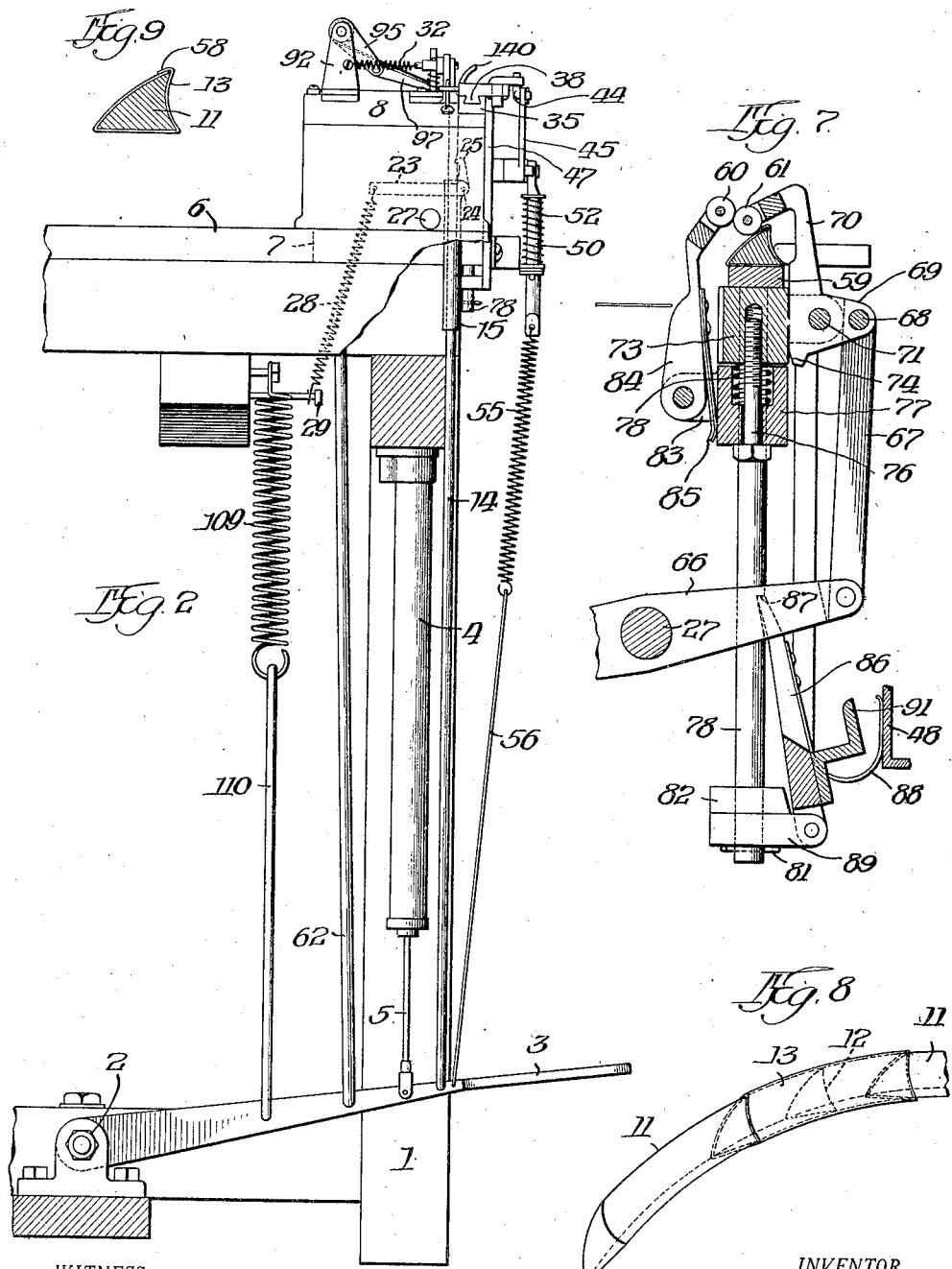
Fig. 2 is a side elevation, part of the table being broken away

To enable the operation of the machine to be understood as the description proceeds it is sufficient to say that the various steps take place in the following sequence: When the machine is in its normal position with the treadle raised as shown in Fig. 2. the leading end of a strip of fabric projects over the applying member. The two ends of the bead may be stuck together, they being covered with sticky cement, and the bead is placed in two grips or holders on either side of the fabric applying members with the splice midway between them. On the depression of the treadle, the first operation is a movement of the knife or shear to sever the leading end of the fabric of sufficient length to encircle the bead. At the same time swinging fingers or holders move over to clamp the bead firmly in place. When the fingers have clamped the bead tightly, the mechanism is so constructed that if the two ends of the bead are not closely abutted the clamps will move slightly towards one another and force the ends into close contact. The clamps thus serve to hold the ends of the bead tightly together while the covering operation is being carried on. The applying members now move toward the bead, carrying with them the severed end of the strip and apply it around the spliced ends of the bead. The treadle is now at the bottom of its movement. On its return the applying members move away from the bead and return to normal position, the fabric feeder operates to advance another length of fabric under the knife and over the applying members and the clamping members release the bead.

Having given this brief summary of the manner in which the machine operates its several parts will be described.

To the foot-treadle 3 is attached a rod 14 to the upper end of which is secured a short length of tube 15 in which is slidingly mounted a second rod 16, the upper end of which is received over a pin 17 in the outer end of a rocking knife blade 18 pivoted on a pin 19. This pin is carried in a bracket 20 secured on the upper side of the base plate 8, a coil spring 21 being carried on the pin 19 and serving to yieldingly hold the side of the knife against the edge of a stationary knife blade 22 set in the base plate at the rear of the recess 9. Movement is communicated from the tube 15 and treadle to the rod 16 by a catch pivoted on the upper end of the tube at 24, the hook end 25 taking into a notch 26 on the rod 16. A suitable form of stop is provided, being shown as a rod 27 extending across the under side of the base plate in such position that the tail of the catch will strike it on the downward movement. A spring 28 is secured to the tail of the catch and is fastened to a pin 29 on the framework. On the downward movement of the rod 14 the tube 15 and rod 16 are held together for a sufficient distance to cause the knife to complete its cutting stroke, at the termination whereof the tail of the catch strikes the stop 27 and the rod 16 is released. The rod 14 and tube 15 are now free to move downward with the treadle while the knife and rod 16 are caused to move upward by a spring 30 surrounding a post 31 secured to the base plate and received in an aperture in the pin 17 at the rear of the knife. An additional spring 32 may be provided extending from the pin 17 to any other part of the machine at the rear of the knife, in this case a pin 33, the spring serving to hold the two knife members in close shearing contact. The knife and tube 16 are retained in normal position by a stop 34 on the post 31 in which position the catch 25 reengages the tube 16 on the completion of the upward movement of the treadle at the termination of the applying operations.

On front of the base plate are formed a pair of longitudinally extending slideways 35 in each one of which is mounted a bead gripping and supporting member designated generally by the numeral 36. As both of these grips are identical a description of one will suffice. Each comprise a slide 37 mounted for movement in the way 35 by a dovetail rib 38. At the rear of the slide is formed a slot 39 in which is received a pin 40 secured in the way 35 limiting the movement of the grip. A small wire spring 141 is secured to the base plate and contacts a pin 142 on the slide to hold it normally at the outward limit of its movement. On the front end of each slide is formed an overhanging stop plate or stationary grip 140, the under-side of which is shaped to correspond with the upper side of the bead 11 (see Fig. 3).

At the rear end of the slide is formed an ear 41 on which is pivotally mounted a movable grip finger 42 the front end of which is formed at such an angle that when moved inwardly it will be in contact with the bead over a considerable surface. The rear end of the finger is formed with a projection 43, in which is loosely mounted a link 44, the other end thereof being connected to a bell-crank lever 45, pivoted at 46 to a bar 47 secured to the face of the base plate and extending downwardly therefrom.

There is a lever 45 for each of the grips and the lower ends of the levers extend horizontally and terminate close to one another, being notched at their abutting ends. There are two bars 47, one at each side of the machine and across the lower ends is secured a plate 48 formed with a bracket 49 in which is slidingly mounted a rod 50. Between the bracket 49 and a washer 51 on the rod is mounted a return spring 52. The upper end of the rod 50 carries a pin 53 on which is mounted a spool shaped roller 54 the central part of which is received in the notches in the ends of the levers 45. A coil spring 55 and a link 56 connects the lower end of the rod 50 with the treadle.

From the description thus far given it will be seen that on depression of the treadle the upper ends of the levers 45 will move toward one another the first action being to move the fingers 42 over toward the guides 140. When the fingers have moved over and firmly gripped the bead ends a further movement of the treadle will cause the slides 36 to move toward each other in the slideways 35, forcing the ends of the bead in close contact and holding them in that position until the covering operation is completed. The spring 55 serves to hold the two ends of the bead together and allow the treadle to continue its movement while the spring 52 returns the parts to their initial position.

The fabric applying or bead covering members will next be described; and it will be understood at this point that at the beginning of the operation the strip of fabric indicated at 57 covered with rubber composition and carried on any suitable supply roll, not shown, projects through the machine and under the knife the front end resting on the fabric applying members. The parts of the machine are so timed that the knife is the first instrumentality to operate and it severs a piece long enough to completely surround the bead and leave a slight overlap as at 58 in Fig. 9, the severed piece lying on the applying members, the knife being so located that the rear end of the fabric will just come to the upper edge of the bead.

The applying members comprise three parts, a central plate 59 the upper surface of which is roughened, being adapted to be brought into contact with the under flat side of the bead, a roller 60 adapted to apply the rear end of the severed piece of fabric up to the upper edge of the bead and a second roller 61 which applies the front end of the piece of fabric to the concave face of the bead and then brings it over and laps it upon the upper side of the bead, the first named roller being so mounted that it will elevate slightly and retreat before the second named roller. This action in Fig. 7.

To the treadle 31 is pivoted a vertical link 62 the upper end of which carries an adjustable clamped collar 63, the purpose of which is to operate the fabric finding mechanism as will appear at the proper time. The upper end of the link 62 is formed with a slot 64 in which is received a pin 65 mounted in the end of a lever 66 pivoted on the rod 27 heretofore described as the stop for the knife actuating mechanism. The slot 64 is provided to afford a proper amount of lost motion in the applying mechanism during which time the knife and fabric feeding mechanism may operate at the beginning and end of a stroke, respectively.

To the front end of the lever 66 is pivoted a link 67 extending upwardly the upper end of which is pivoted to a pin 68 on projections 69 formed on an arm 70 pivoted in turn on a pin 71 carried in brackets 72 on a movable head 73. (See Figs. 3, 6 and 7). The upper end of the arm 70 is bent at a little more than a right angle and carries at its outer end the roller 61 which normally bears against the side of the central plate 59, the upper side of the arm forming a rest for the leading end of the fabric. The tail end of the arm 70 is formed as a stop 74 bearing against the head 73 stopping the arm with the roller in the position shown in Fig. 3.

About midway of the bars 47 is secured a plate 75 the central portion of which forms a shelf on which certain of the parts rest when the machine is not operating. In the center of the movable head 73 is secured a bolt 76 which extends downwardly from the movable head, the head of the bolt supporting a cross head 77, a spring $78^x$ surrounding the bolt and having a tendency to separate the movable head 73 and the cross head 77 but to allow a certain independent movement of the cross head. In the part 73, there are arranged to be received rods 78, herein referred to as friction rods which are attached to the central plate 59 and extend through apertures in the shelf 75. Friction packings 79 are held in the movable head 73 against the friction rods, the pressure being controlled by set screws 80 screwed into the head 73. The lower ends of the friction rods carry stops 81, which, when the central plate is at the upper limit of its movement, contact a shelf 82 attached to the lower ends of the bars 47. By means of these rods 78 and the friction packing the movable head 73 will carry the central plate 59 up with it until it strikes against the under-side of the bead pressing the severed strip of fabric against it, at the same time the movement of the rods being arrested by the stops 81. The head 73 can now continue its upward movement.

The cross head 77 carries a pair of brackets 83 on which is pivotally mounted a lever 84 the upper end of which is bent forward slightly and carries the roller 60. A flat spring 85 is secured to the arm and bears against the cross head serving to urge the roller 60 inward toward the bead. The purpose of the spring $78^x$ is to allow the roller 60 to move upwardly slightly so that the roller 61 can perform its function of making the overlap 58 without pinching the fabric, the roller 60 riding on top of the roller 61, this action preventing the fabric from being creased or pinched between the rollers.

When the friction rods 78 have moved the central plate 59 up against the bead and the movement has been stopped by 81, integrally formed spring operated catches 86, snap into notches 87 on the friction rods, serving to hold the central plate against the underside of the bead. The springs for the catches 86 are shown at 88 and bear against the rear side of the bracket 48. The lower end of the catches are pivoted to a plate 89 secured to the shelf 82 by screws 90. On the catches is provided a knock-off formation 91 which is struck by the end of the lever 66 near the downward limit of its movement and when the rollers 60 and 61 have passed into line with the top of the central plate whereupon the friction members 79 operating on the friction rods, will pull the central plate downward to the starting position.

Figure 3:
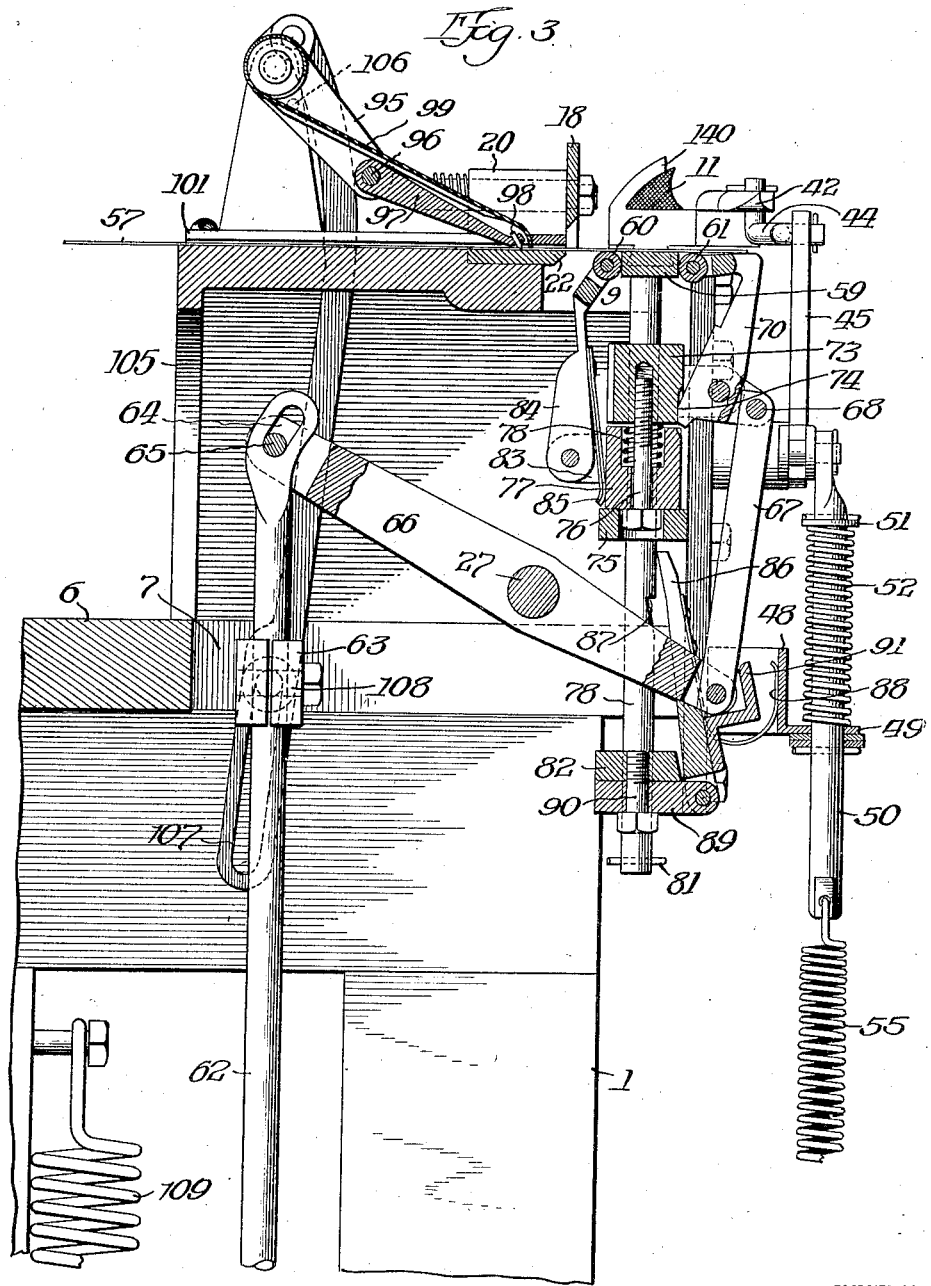
Fig. 3 is a longitudinal section through the center of the machine

After the applying members 59, 60 and 61 have been returned to their normal position as shown in Fig. 3 the fabric feeding mechanism is brought into play. At the rear of the base plate are mounted a pair of brackets 92 in the upper ends of which is secured a pin 93 carrying a sleeve 94 integrally formed with which are a pair of arms 95 across the ends of which is mounted a pin 96. A floating arm 97 is loosely mounted on the pin the free end of which carries cloth gripping pins 98 set at an acute angle to the travel of the fabric 57 a light spring 100 holding the arms on the fabric. Loosely held on the sleeve is a light metallic detent 99 the lower end of which rests on the upper surface of the fabric and prevents it being drawn backwardly. On the upper surface of the base plate is secured a guide plate 101 the central portion of which is slotted as at 102 to permit travel of the fabric feeding member 97. The upper surface of the base plate may be grooved as at 103 to permit the pins to enter the fabric, and the under side of the guide plate is formed with overhanging portions to guide the fabric. Formed integrally with the sleeve is a crank 104 to which is pivotally secured a hanging link 105. A stop pin 106 is fastened to the inner face of the bracket 92 next to the crank 104 and in its path, the object being to afford a stop for the movement of the sleeve and consequently the fabric feeding mechanism.

The swinging end of the link 105 is slotted as at 107, the slotted end being received over a roller shown in dotted lines at 108 carried on the collar 63 previously described as adjustably secured to the operating rod 62 of the applying mechanism. The length of the slot 107 and the position of the roller 108 are so arranged that as the rod 62 reaches the lower limit of its movement the roller strikes the lower end of the slot pulling the link down and drawing the fabric feeding member back to the rearward limit of its travel. During the completion of the applying operation and until the members 59, 60 and 61 have reached their normal position there is no movement of the feeding member due to the slots 107 and 64 providing the proper lost motion. When, however they have assumed their normal position with the cross head 77 on the shelf 75 the roller 108 has reached the upper end of the slot and on a continued movement upward of the rod 62, which is allowed by slot 64, the link 105 is moved upward projecting the fabric feeding member forward, thrusting the end of the fabric over the applying members in position to be cut off by the knife and applied to the bead in the next operation.

A heavy spring 109 fastened to the framework and connected to the treadle 3 by a link 110 gives the treadle and its connected links the necessary return travel.

A brief review of the operation of the various parts may be beneficial to a complete understanding of the entire machine.

The operator places the two cement covered ends of the bead in juxtaposition and places them on the supports 36 with the splice to be covered at about the center of the machine midway between the grips 140, and depresses the treadle. The first operations to take place are the severing of a length of fabric long enough to surround the bead with the required overlap and the gripping of the ends of the beads between the parts 140 and 42. The next movement is the forcing together of the ends of the beads by the movement of the slides or supports 36, by means of which, aided by the spring 55 the ends of the bead are held tightly together until the splicing is completed. At the same time the members 59, 60 and 61 are elevated carrying upward the severed piece of fabric. The central plate 59 presses the central portion of the severed piece against the under side of the bead, the roller 60 applies the rear end of the piece to the top of the bead and the roller 61 applies the front end of the piece to the concave portion of the bead and brings it free around the upper edge of the bead and forms the overlap 58, the roller 60 rising over the roller 61 and retreating, as has been described. Upon return of the treadle due to the spring 109 the parts 59, 60 and 61 reassume their normal position and the fabric feeding member makes its forward stroke advancing the end of the fabric.

Although the machine is shown in great detail, the invention contained herein is not limited to the exact form shown but covers such changes or modifications as are in the scope of the appended claims. I believe that I am the first to construct a machine which will present a strip of fabric to an applying mechanism and apply it over a bead splice, and as such am entitled to a liberal means of protection. As far as known to me this operation has been done by hand and this machine is the first to replace hand operations for this step in the manufacture of pneumatic tires.

I claim:

1. In a machine for the purpose specified, the combination of a support for holding the bead, means for applying a piece of fabric to one side of the bead, and instrumentalities to bring the fabric around and apply it to the remaining sides of the bead while the bead is stationary.

2. In a machine for the purpose specified, the combination of a support for the bead, means for feeding a piece of fabric to the bead at an angle to the plane of the bead and mechanism for applying the fabric about the bead.

3. In a machine for the purpose specified, the combination of a support for the bead, means for feeding a strip of covering material to the bead, means for severing the leading end of the strip, and applying members adapted to bring the severed end of the fabric about the bead and apply it thereto.

4. In a machine for the purpose specified, the combination of a support for the bead, means for advancing a strip of covering material, means for bringing the fabric about the bead and applying it thereto, and a knife for severing the fabric.

5. In a machine for the purpose specified, the combination of a support for the bead, means for advancing a strip of covering material, a knife for severing the fabric and means for presenting the severed end of the fabric to the bead and wrapping it about the bead.

6. In a machine for the purpose specified, the combination of a support for the bead, means for pressing together the two ends of the bead and means for applying a piece of fabric to one side of the bead, and instrumentalities to bring the fabric around and apply it to the remaining sides of the bead.

7. In a machine for the purpose specified, the combination of a support for the bead, means for pressing together the two ends of the bead, means for feeding a strip of covering material to the bead, means for severing the leading end of the strip, and applying members adapted to bring the severed end of the fabric about the bead and apply it thereto.

8. In a machine for the purpose specified, the combination of a support for the bead, means for pressing together the two ends of the bead, means for advancing a strip of covering material, means for bringing the fabric about the bead and applying it thereto, and a knife for severing the fabric.

9. In a machine for the purpose specified, the combination of a support for the bead, means for pressing together the two ends of the bead, means for advancing a strip of covering material, a knife for severing the fabric and means for presenting the severed end of the fabric to the bead and applying it thereto.

10. A device for applying fabric to a bead, comprising a member adapted to apply the fabric to the flat surface of the bead, pivotally mounted levers, and rollers on said levers for applying the fabric to the curved sides of the bead and means for moving the rollers transversely of the curved surfaces.

11. Devices for applying fabric to a bead comprising a central plate adapted to apply the fabric to the flat surface of the bead, pivotally mounted levers, rollers on said levers and located at the sides of said plate for applying the fabric to the curved sides of the bead, and means for moving the rollers over the curved surfaces.

12. Devices for applying fabric to a bead, comprising a central plate adapted to apply the fabric to the flat surface of the bead, rollers at the sides of said plate for applying the fabric to the curved sides of the bead, flexible mounting for said rollers permitting them to move transversely for actuating said clamping mechanism, feeding means operative to introduce a strip of fabric between the plate and the bead, and means for moving the rollers over the curved surfaces.

13. Devices for applying fabric to a bead, comprising a central plate adapted to apply the fabric to the flat surfaces of the bead, rollers at the sides of said plate for applying the fabric to the curved sides of the bead, feeding means operative to introduce a strip of fabric between the plate and the bead, means for pressing the plate against the bead and means for moving the rollers over the curved surfaces.

14. Devices for applying fabric to a bead, comprising a central plate adapted to apply the fabric to the flat surface of the bead, rollers at the sides of said plate for applying the fabric to the curved sides of the bead, feeding means operative to introduce a strip of fabric between the plate and the bead, a knife for severing the fabric, and means for pressing the plate against the bead and means for moving the rollers over the curved surfaces.

15. Devices for applying fabric to a bead, comprising a central plate adapted to apply the fabric to one surface of the bead, smoothing members located at each side of the plate for applying the fabric to the remaining surfaces of the bead, means for causing said members to rise above the upper surface of the plate and pass over the remaining surfaces of the bead.

16. Devices for applying fabric to a bead, comprising a central plate adapted to apply the fabric to one surface of the bead, smoothing members located at each side of the plate for applying the fabric to the remaining surfaces of the bead, a yieldable mounting for one of said members, and means for causing said members to rise above the upper surface of the plate and pass over the sides of the bead.

17. Devices for applying fabric to a bead, comprising two smoothing members for applying the fabric to surfaces of the bead, means for causing said members to approach one another at the edge of the bead, one of said members being yieldably mounted to retreat before the approach of the other member, whereby an overlap is formed on the bead.

18. Devices for applying fabric to a bead, comprising two smoothing members for applying the fabric to surfaces of the bead, means for causing said members to contact one another at the edge of the bead, a resiliently mounted support for one of said members, and means for positively moving the other of said members against the first.

19. In a machine of the character described, the combination of longitudinally movable bead supports, clamping mechanism on said supports movable to clamp the ends of the beads, means to move said supports towards one another, and a fabric applying member located between said supports.

20. In a machine of the character described, the combination of longitudinally movable bead supports, clamping mechanism on said supports movable to clamp the ends of the beads, means for actuating said clamping mechanism, and a fabric applying member located between said supports.

21. In a machine of the character described, the combination of longitudinally movable bead supports, clamping mechanism on said supports movable to clamp the ends of the beads, means to move said supports towards one another, a fabric applying member located between said supports, and means to position a severed piece of fabric on said applying member.

22. In a machine of the class described, the combination of means for supporting the free ends of material, means for causing the ends to be forced together in abutting relation, and means for applying a securing means to the ends while so held.

23. In a machine of the class described, the combination of a pair of supports adapted to hold the free ends of the material, clamping means to clamp the ends on the supports, means to force the supports together to locate the ends of the material in abutment, and means for applying a securing means to the ends while so held.

24. A bead splicing machine comprising, in combination, means for clamping the free ends of a bead in spaced relation and in alignment, means for moving the clamps to press the ends together forcibly in abutment, and means for permanently securing the ends together while subject to the pressure.

25. In a machine of the class described, the combination with means for holding the two ends of a bead in abutting relation, of means for wrapping a piece of fabric around the abutting ends.

26. A bead splicing machine comprising, in combination, means for holding the two ends of a bead in abutting relation and under pressure, and means for applying a piece of fabric around the abutting ends while so held.

27. A bead splicing machine comprising, in combination, means for clamping the ends of a bead in spaced relation, means for moving the clamps to press the ends together, and means to apply a piece of fabric around the ends of the bead.

EDWARD D. PUTT.